United States Patent [19]

Harper

[11] 4,246,787
[45] Jan. 27, 1981

[54] FAST RESPONSE TEMPERATURE SENSOR AND METHOD OF MAKING

[75] Inventor: V. Paul Harper, Attleboro, Mass.

[73] Assignee: Texas Instruments Incorporated, Dallas, Tex.

[21] Appl. No.: 48,123

[22] Filed: Jun. 13, 1979

[51] Int. Cl.³ .............................................. G01K 7/22
[52] U.S. Cl. ................................ 73/362 AR; 29/612; 338/22 R
[58] Field of Search ............ 73/362 AR, 362 SC, 349; 338/22 SD, 22 R; 29/612

[56] References Cited

U.S. PATENT DOCUMENTS

| 3,147,457 | 9/1964 | Gill et al. ........................ 73/362 AR |
| 3,936,789 | 2/1976 | Matzen ........................... 338/22 SD |
| 4,142,170 | 2/1979 | Blatter ........................... 73/362 AR |

OTHER PUBLICATIONS

"Planar Semiconductor Temperature Sensor etc." Wiemer et al., The Automotive Application of Sensors, Society of Automotive Engineers, Inc., Warrendale, Pa., 1977.

Primary Examiner—Donald O. Woodiel
Attorney, Agent, or Firm—James P. McAndrews; John A. Haug; Melvin Sharp

[57] ABSTRACT

A temperature sensing apparatus particularly adapted for use in a rarefied fluid media has a sensing device including a small spreading resistance type of resistor element formed of a semiconducting material of positive temperature coefficient of resistivity. Leads connect the element in a circuit; the element is encapsulated; and a vane of high thermal conductivity is secured in heat-transfer relation to the element to extend outside the encapsulating material for conducting heat to the element from a temperature zone to be monitored. The apparatus includes mounting apparatus having a plurality of housing sections of low thermal conductivity which are secured together to hold the sensing device therebetween. The housing sections hold the sensing device so that the vane is exposed in the temperature zone and the housing sections have extensions disposed in spaced surrounding relation to the vane for physically protecting the vane while permitting fluid to flow over the vane. A metal bushing carries a mounting element and is secured over the housing section at one end for permitting the vane and the leads to extend from opposite ends of the bushing. Preferably first ends of the leads have limited cross sections to limit heat loss from the element. The opposite lead ends have larger cross sections to improve lead strength. First portion encapsulates the resistor element and the first lead ends while a second portion encapsulates the leads between the large and small cross sections thereof. The housing sections then engage the second encapsulation to provide desired strain relief between the lead ends.

12 Claims, 11 Drawing Figures

FAST RESPONSE TEMPERATURE SENSOR AND METHOD OF MAKING

There are many well known temperature sensing systems which are in wide use today for a variety of control purposes. Such systems include thermocouples, active semiconductor devices, thermistors of negative temperature coefficient of resistivity, metal wire resistors of positive temperature coefficient of resistivity, ceramic resistors of more sharply positive temperature coefficient of resistivity, and bimetal discs and the like. Although such systems are now widely used, all of the systems are subject to one deficiency or another so that, for each potential temperature sensing requirement being considered, most of the commonly used systems are either too slow or unreliable or too expensive to be commercially practical. That is, the capabilities of the sensing systems have to be very carefully matched to the control requirements to meet the needs of each specific control application and even then some undesirable compromises usually have to be made. In this situation, a need is now growing for increasingly faster and more precise temperature sensing systems which must be available at low cost for use in a number of new control applications of wide commercial and social significance. For example there is now a need for fast, precise, rugged and low cost temperature sensors for use in engine manifolds and the like to optimize automotive engine performance under continuously varying environmental and operating conditions. It is believed that the known temperature sensing systems noted above will be inadequate for meeting the response time, precision, reliability and cost needs and the like of such new control applications.

More recently, new spreading resistance types of resistor elements have been developed utilizing silicon semiconducting materials or the like which have desirable, positive temperature coefficients of resistivity in selected temperature ranges. Such spreading resistors are adapted to be provided with precisely predetermined resistance characteristics at low cost and, when used for temperature sensing purposes, are adapted to provide output signals of substantial linearity to be compatible with microcomputer automotive control systems and the like. Such resistor elements have been proposed for use for temperature sensing purposes in some of the new types of control applications as noted above. However, when such resistor elements have been proposed for use in sensing temperature changes in an air-fuel mixture in an automotive engine manifold or in other rarefield media or the like, the resistor elements have not previously been adapted to be mounted in such environments while also achieving sufficiently fast response time and the like for meeting the needs of the new control applications.

It is an object of this invention to provide novel and improved temperature sensing apparatus; to provide such apparatus which displays very fast response to changes in temperature even in rarefield media such as air-fuel mixtures in automotive engines and the like; to provide such sensing aoparatus which is precise, rugged and reliable in use in automotive environments; to provide such sensing apparatus which is inexpensive to manufacture; which is adapted to conveniently manufactured, handled, installed and used without excessive risk of damage, and which is compatible for use with microcomputer control systems and the like. It is also an object of this invention to provide novel and improved methods of making such apparatus.

Briefly described, the novel and improved temperature sensing apparatus comprises temperature sensing means which include a resistor element having a resistivity which varies with change in temperature. Preferably for example the resistor element comprises a small spreading resistance type of resistor element incorporating a semiconducting material which has a positive temperature coefficient of resistivity in a selected temperature range. The sensing means further include lead means for electrically connecting the resistor element in an electrical circuit, means encapsulating the resistor element for shielding the element from the environment in a zone whose temperature is to be monitored, and vane means or the like of relatively greater thermal conductivity than the encapsulating means secured in heat transfer relation to the resistor element so that a portion of the vane means extends outside the encapsulating means for receiving and conducting heat to the resistor from the temperature zone.

The apparatus further includes a plurality of housing sections of an organic material or the like of relatively low thermal conductivity which are secured together for holding the temperature sensing means therebetween. The housing sections hold the sensing means so that the extending portion of the vane is exposed to receive and conduct heat from the noted temperature zone. The housing sections also have extensions thereof which are disposed in spaced surrounding relation to the exposed vane portion for physically shielding the vane from blows during handling and use while also permitting fluid to flow freely over the vane in the temperature zone. Preferably a metal bushing has threaded mounting means or the like and is secured over the housing sections at one end thereof to permit the vane and lead means to extend from respective opposite ends of the bushing.

In preferred embodiments of the invention, first ends of the noted lead means are of limited cross sectional size to limit heat transfer from the resistor element through the leads. The opposite ends of the leads are of larger cross section to improve lead strength. First means encapsulate the resistor element and the first lead ends to shield the element and to locate the leads relative to the element.

Second means encapsulate additional portions of the leads between the smaller and larger cross sections thereof. The housing sections are then engaged with the second encapsulation to hold the sensing means between the sections. In that way, strain relief is provided between the lead ends connected to the resistor element and the lead ends connecting the apparatus in an electrical circuit.

In making the preferred embodiments of the temperature sensing apparatus as noted above, the noted lead and vane means are provided in a lead frame means. The resistor element is secured in heat-transfer relation to the vane and is electrically connected to the lead means. The first and second encapsulating means are then applied to the resistor element, the leads and the vane means for forming the desired temperature sensing means for use in the apparatus of this invention.

Other objects, advantages and details of the novel and improved temperature sensing aapparatus, temperature sensing means, and method of this invention appear in the following detailed description of preferred embodiments of the invention, the detailed description referring to the drawings in which:

Figure 1:
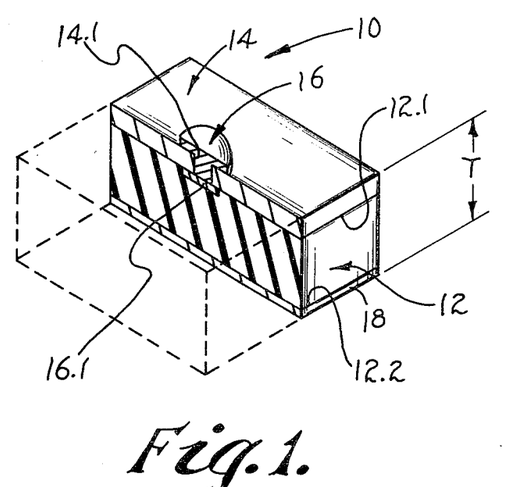
FIG. 1 is a perspective view to large scale of a spreading resistance type of resistor element used in a preferred embodiment of the apparatus of this invention, the resistor being partly cut away to illustrate its structure.

Referring to the drawings, 10 in FIG. 1 indicates a spreading resistance type of resistor element which is shown to include a body 12 of a crystalline semiconducting material such as silicon or the like having a selected dopant or impurity density therein for providing the semiconducting material with a desired, positive temperature coefficient of resistivity in a selected temperature range. The body has a generally planar configuration as shown having relatively broad, flat opposite sides 12.1 and 12.2 and having a controlled thickness T which is provided in any conventional manner. One side 12.1 of the semiconductor body is substantially covered with an oxide coating 14 and a central opening 14.1 is provided in the coating in a very accurate manner by conventional photo-lithographic techniques or the like. Electrically conductive contact coatings 16 and 18 are then deposited on the opposite sides of the body 12 in ohmic contact relation to the material of the body in any conventional manner. If desired, the dopant or impurity concentration is increased in the area 16.1 by conventional diffusion techniques or the like prior to deposition of the contact 16 for improving the ohmic contact made to the resistor body material by the contact means 16.

Such spreading resistance types of resistor elements utilizing semiconducting materials of positive temperature coefficient of resistivity are conventional and are well known and are described in U.S. Pat. No. 3,936,789 and in "Planar Semiconductor Temperature Sensors etc.," Weimer et al., *The Automotive Applications of Sensors*, Society of Automotive Engineers, Inc., Warrendale, Pa., 1977. Accordingly the spreading resistor elements are not further described herein and it will be understood that, in such resistor elements, the semiconducting body material is provided with desired resistance properties with a high degree of uniformity by well known, economical semiconducting manufacturing techniques. Further, in the spreading resistance configuration, the diameter of the contact 16 is the primary dimensional feature determining the resistance properties of the element and that diameter is adapted to be easily and economically controlled by well known manufacturing techniques as noted above. Accordingly, the resistor element 10 is adapted to be manufactured at very low cost and to display very precisely predetermined resistance properties.

Figure 8:
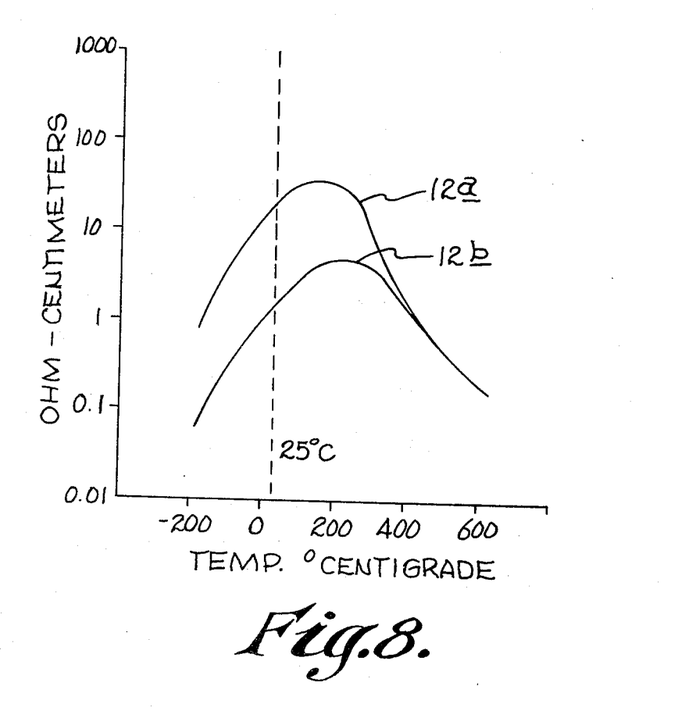
FIGS. 8-10 are graphs illustrating characteristics of the apparatus of this invention.
Figure 9:
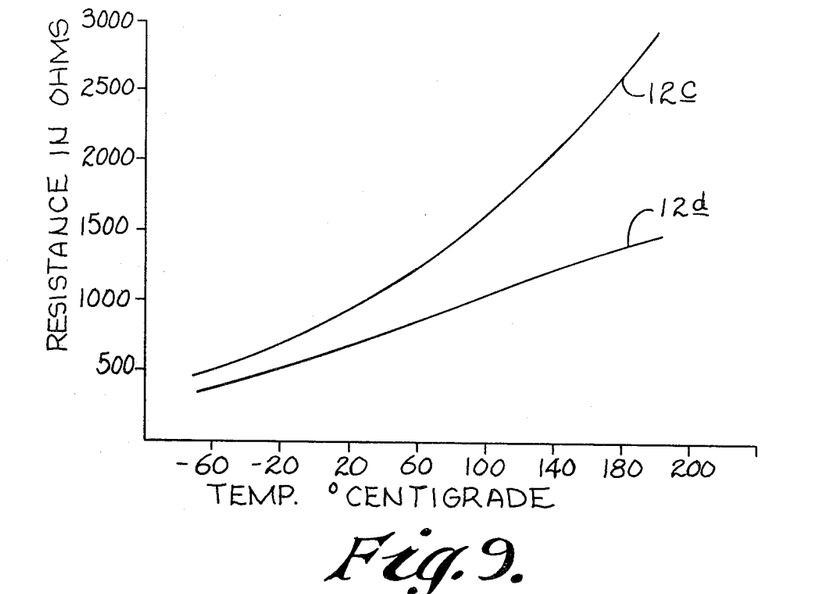

In this regard, the spreading resistance elements 10 as used herein are preferably formed of silicon materials having dopant or impurity densities or concentrations in the range from about $5 \times 10^{14}/cm.^3$ to $5 \times 10^{15}/cm.^3$. Such semiconductor materials display room temperature resistivities in the range from about 10 to 1 ohm-centimeters and as is illustrated by curves 12a and 12b in FIG. 8 respectively are adapted to display generally linear, positive temperature coefficients of resistivity in the temperature range from $-55°$ C. to $125°$ C. Typically also the resistor element 10 as utilized herein has a length and width of about 0.015 inches, a thickness T of about 0.007 inches, and a contact 16 of a diameter of about 0.001 inches. Where the resistor body material has a room temperature resistivity of about 5.6 ohm-centimeters, the resistor element has a nominal resistance value of about 1000 ohms at room temperature. With those dimensions, the resistor element 10 also has a very small heat capacity as will be understood. If desired, the temperature-resistance characteristics of the element 10 as indicated by curve 12c in FIG. 9 may be made linear as indicated by curve 12d in FIG. 9 where a conventional resistor (not shown) is secured in shunt relation to the resistor 10 in any conventional manner.

Figure 2:
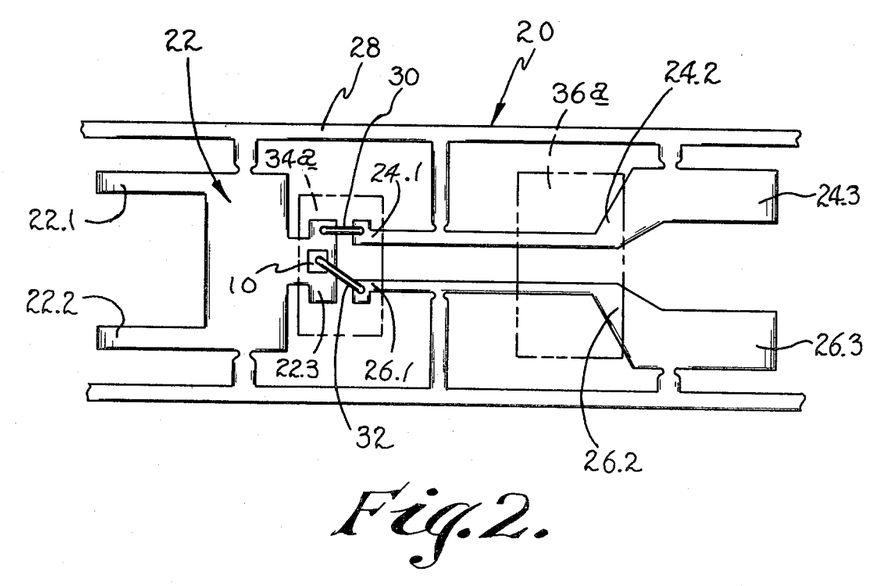
FIG. 2 is a partial plan view diagrammatically illustrating a step in the method of this invention.

In a preferred embodiment of this invention, lead frame means 20 are provided in a conventional continuous strip configuration as is illustrated in FIG. 2 but in accordance with the method of this invention, each unit of the lead frame means includes a thermally-conducting vane means 22, a pair of leads 24, 26, and skeleton means 28 for temporarily holding the vanes and leads in the configuration shown in FIG. 2. The lead frame means 20 is preferably formed of a metal material such as copper, or copper clad stainless steel or the like of relatively high thermal conductivity and preferably has a thickness in the range from about 0.0025 to 0.0050 inches or the like.

Preferably as shown in FIG. 2, the vane means has end extensions 22.1 and 22.2 for a purpose to be described below and also includes a pad portion as illustrated at 22.3 in FIG. 2. Typically, the vane means has a width of about 0.150 inches and an overall length on the order of about 0.235 inches so that the vane means has a surface to volume ratio of at least about 25 to 1 $in^2/in.^3$ or more.

Preferably also, the leads 24 and 26 have first ends 24.1, 26.1 adjacent the vane pad which are of relatively small cross sectional size as shown in FIG. 2. The leads also have additional portions 24.2, 26.2 where the leads widen to provide relatively greater cross sectional size extending out to the opposite ends 24.3, 26.3 of the leads.

In a preferred embodiment of this invention, the resistor element 10 is secured in efficient heat-transfer relation to the vane means 22, and the leads 24, 26 are electrically connected to the element for connecting the element in an electrical circuit. Preferably for example, the ohmic contact 18 of the resistor is soldered or otherwise secured in electrically and thermally conducting relation to the pad of the vane 22 by the use of a gold eutectic or the like. Fine gold wires 30, 32 or the like bonded to the lead ends 24.1, 26.1 are respectively connected to the vane 22 and to the ohmic contact 16 of the resistor element. Where the spreading resistor 10 and the vane means 22 have proportions as illustrated in FIG. 2 and as described above it will be appreciated that the vane means has a heat capacity which greatly exceeds the heat capacity of the resistor element. In this regard, it should also be noted that although the element 10 is shown to comprise a spreading resistor element embodying a crystalline semiconducting material, the resistor could be formed of any body of resistance material which varies in resistivity with change in temperature within the scope of this invention.

Figure 3:
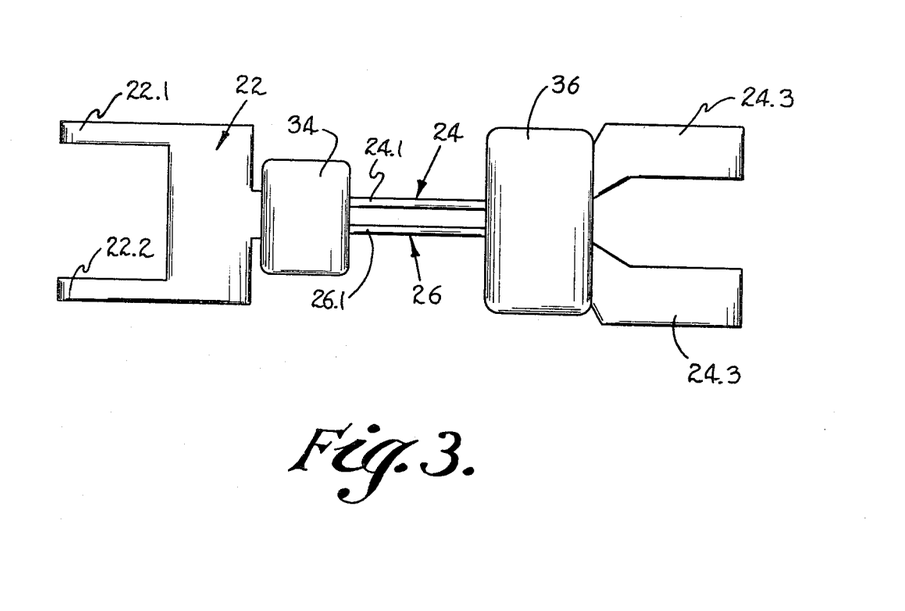
FIG. 3 is a plan view similar to FIG. 2 illustrating the novel temperature sensing means provided by this invention.
Figure 4:
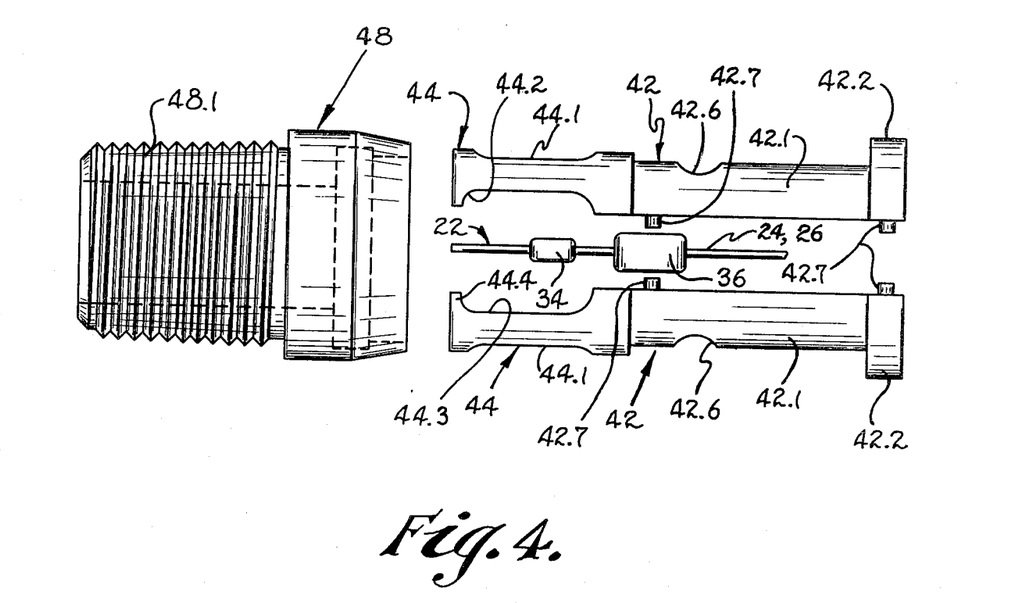
FIG. 4 is an exploded side elevation view of the temperature sensing apparatus of this invention, the sensing means used in the apparatus being shown to relatively smaller scale than in FIG. 3.

In a preferred embodiment, a first encapsulation 34 of glass filled nylon or other organic, dielectric material or the like of relatively low thermal conductivity is formed in sealing relation around the resistor element 10, around a portion of the vane 22, and around the first lead ends 24.1, 26.1 as is indicated at 34a in FIG. 2. In addition, a second encapsulation 36 of the same or similar material is formed around the additional portions 24.2, 26.2 of the leads (where the leads widen to their relatively larger cross section) in spaced relation to the first encapsulation 34. The second encapsulation is indicated by broken lines 36a in FIG. 2. The skeleton 28 is then cut from the lead frame means 20 in any conventional manner for forming the novel and improved temperature sensing means 38 as shown in FIG. 3.

In that arrangement, the first encapsulation 34 shields the resistor element from its surrounding environment so that the sensing means 38 is adapted for use in various automotive applications. The first encapsulation also holds the leads 24, 26 in predetermined position relative to the resistor 10. The vane 22 is secured in efficient heat-transfer relation to the resistor and the vane extends out of the first encapsulation for receiving and conducting heat to the resistor from the surrounding environment. As the vane is formed of a material of relatively much greater thermal conductivity than the encapsulating means and has a very high surface volume ratio, the vane is adapted to change temperature rapidly in response to change in temperature of the surrounding environment. In addition, because the resistor element 10 is very small and has a heat capacity which is much smaller than that of the vane, the resistor element is adapted to change its temperature substantially simultaneously in response to change in temperature of the vane means.

In the preferred embodiment of this invention, the temperature sensing means 38 is combined with mounting means of special configuration to form the novel and improved temperature sensing apparatus 40 as shown in FIGS. 4-7.

The mounting means includes a plurality of housing sections which are secured together around the sensing means 38 for holding the sensing means therebetween. Preferably, for example, the mounting means includes a pair of substantially identical housing sections 42 each of which is molded of a glass filled nylon or other material of relatively low thermal conductivity and each of which is a generally semicylindrical shape. Each section has a main portion 42.1 with an outer boss 42.2 at one end. The inner semicylindrical diameter of the main portion also has one part 42.3 of relatively large diameter, another part 42.4 of relatively small diameter to fit snugly around the second encapsulation 36 of the sensing means, and a third part 42.5 which is preferably just large enough to pass the leads 24, 26 where the leads extend between the two encapsulations of the sensing means. Preferably the main housing portion 42.1 has apertures 42.6 opening into the large diameter part 42.3 of the housing section and the housing section preferably have pins 42.7 and recesses 42.8 molded therein which are adapted to interfit with corresponding recesses and pins in the other housing section.

In preferred embodiments of the invention, the housing sections also have extensions thereof 44 at one end of the sections. The extensions are also generally of a semicylindrical shape but are substantially cut away at 44.1, 44.2 and 44.3. The extensions also preferably have tip portions 44.4 at the distal ends of the extensions as shown in FIGS. 6 and 7.

Figure 5:
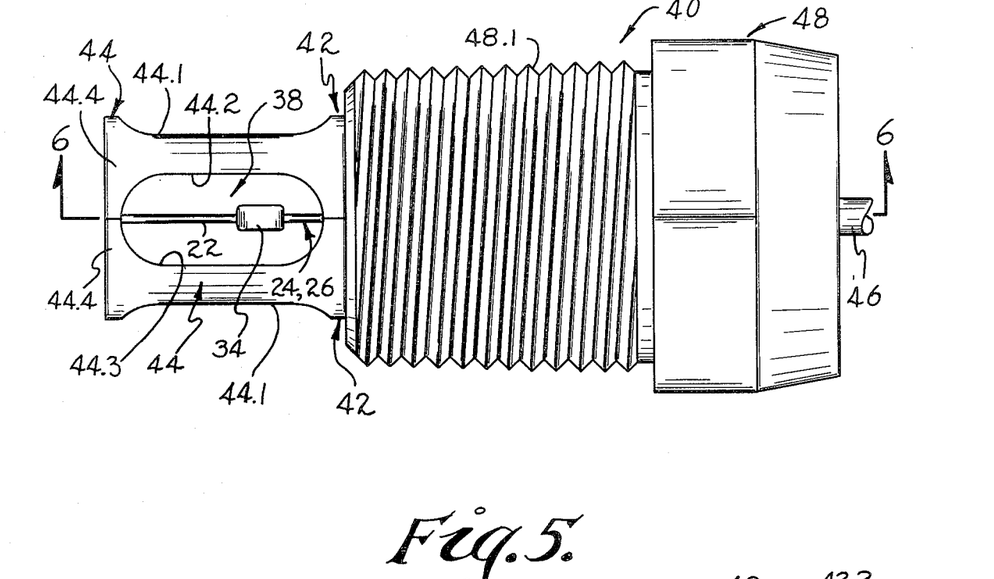
FIG. 5 is a side elevation view to enlarged scale of the apparatus provided by this invention.
Figure 6:
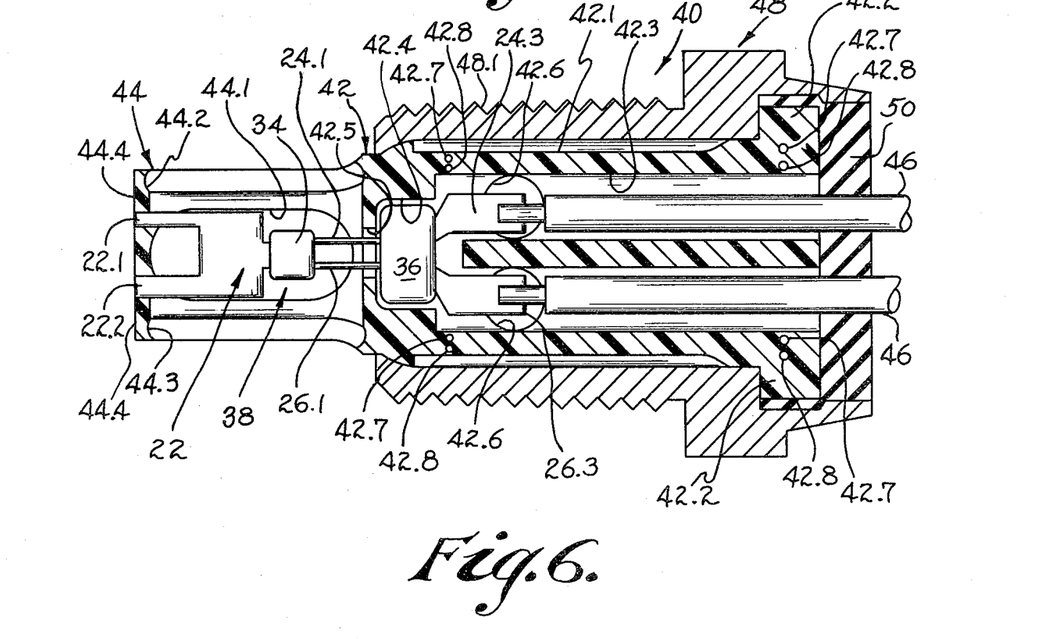
FIG. 6 is a section view along line 6—6 of FIG. 5.
Figure 7:
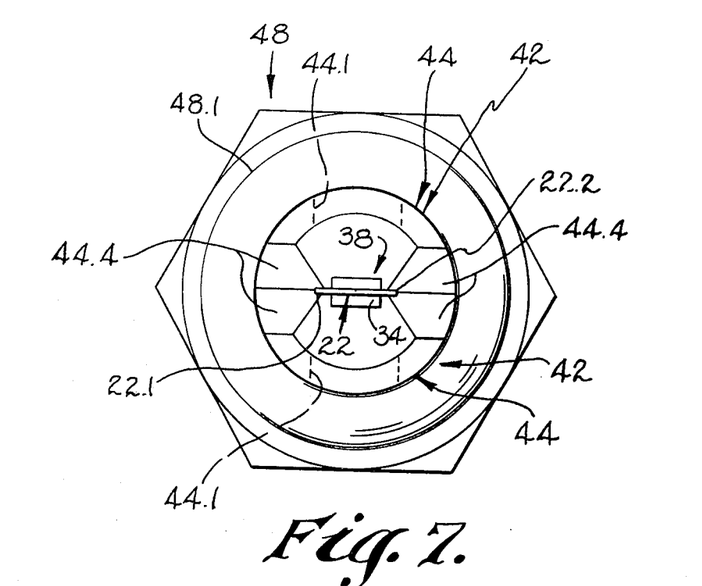
FIG. 7 is an end elevation view of the apparatus shown in FIG. 5.

The housing sections 42 are then secured together around the temperature sensing means 38 for holding the sensing means therebetween while exposing the vane 22 to the environment between the housing extensions 44 as is best shown in FIGS. 5-7. That is, the semicylindrical housing sections are abutted to interfit pins 42.7 and recesses 42.8 so that the sections engage the second encapsulation 36 to hold the sensing means 38 between the sections, so that the large lead ends 24.3, 26.3 extend into the large diameter parts 42.3 of the housing sections, and so that the extending ends 22.1, 22.2 of the vane are gripped and held between the tips 44.4 of the housing extensions.

In that structure, the large lead ends 24.3, 26.3 are positioned to be conveniently welded through the apertures 42.6 to lead wires 46 for connecting the sensing means 38 in an electrical circuit. Preferably a metal bushing 48 of brass or the like is fitted over the housing sections at one end thereof and is secured to the housing sections with an epoxy cement 50 or in other conventional manner so that the vane 22 extends from one end of the bushing and the lead wires 46 extend from the opposite end of the bushing. Preferably the bushing has external screw threads 48.1 or other mounting means thereon for use in mounting the apparatus 40 in a zone whose temperature is to be monitored.

In that construction of the apparatus 40, the bushing 48 permits convenient mounting of the apparatus 40 in automotive applications and the like so that the vane 22 is exposed to a rarefied media in a temperature zone to be monitored and so that the lead wires 46 are conveniently connected in a circuit outside of the zone. The housing extensions 44 are disposed in spaced surrounding relation to the vane 22 to shield the vane from physical blows during handling, mounting and use of the apparatus but also expose the vane to free flow of a rarefied media around the vane. The vane is thus exposed to be rapidly responsive to temperature change in the zone. The tips of the housing sections hold the vane so that it does not vibrate excessively. The first lead ends 24.1, 26.1 are of small cross section so that the leads do not tend to withdraw very much heat from the resistor element 10 within the sensing means and in any event the first lead ends are exposed to substantially the same temperature conditions as the vane 22. Accordingly, the sensing means 38 properly responds to the temperature changes in a temperature zone being monitored. On the other hand, the second encapsulation of the sensing means is engaged by the housing sections 42 and therefore provides substantial strain relief between the lead wires 46 and the small lead ends 24.1, 26.1. Accordingly the apparatus 40 is adapted to display very fast and very reliable response to temperature changes in a temperature zone even though there is only a rarefied media in the zone.

Figure 10:
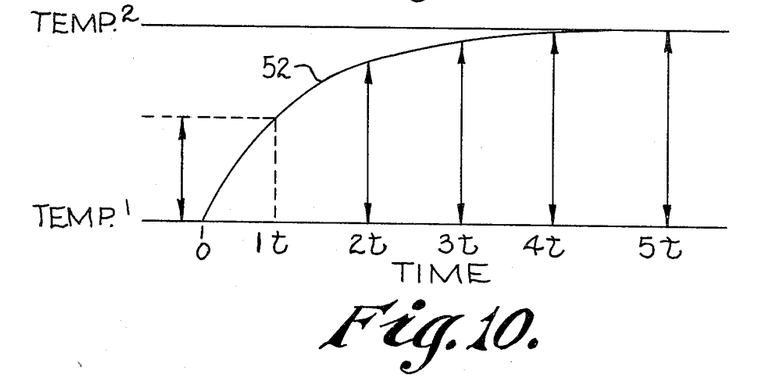
Figure 11:
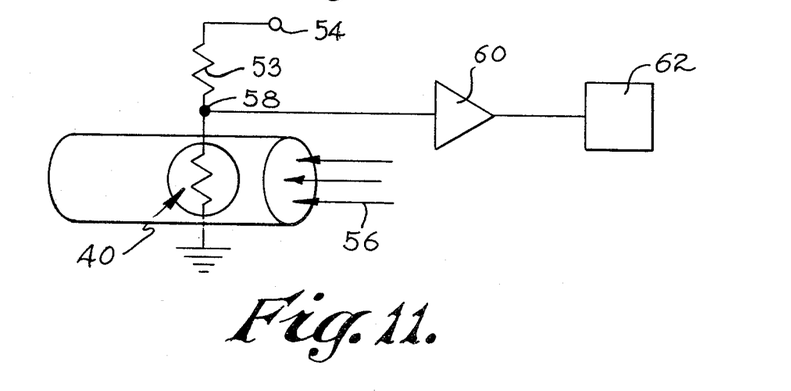
FIG. 11 is a schematic view illustrating use or application of the apparatus of this invention.

Thus, as is indicated by curve 52 in FIG. 10, where the temperature in the zone is abruptly changed from Temperature 1 to Temperature 2, the signal output from the apparatus is adapted to reflect 62.3 percent of that temperature change within one time period "1t" as indicated in FIG. 10 and is adapted to fully reflect that temperature change in five times that period "5t" as shown in curve 10. In this regard, the apparatus 40 is adapted to display time constants "t" on the order of 1-2 seconds even in rarefied media such as air moving at a rate of about 1500 feet/min. That is, when the sensor apparatus 40 is connected in series with a limiting resistor 53 between a reference voltage 54 and ground as shown in FIG. 11 and is exposed to a flow of air or air-fuel mixture or other fluid or the like as indicated at 56 in FIG. 3, the resistance of the resistor element 10 in the apparatus 40 rapidly changes with changes in the temperature of the fluid. The voltage of 58 is furnished to a conventional analog to digital converter 60 and to a microprocessor 62 which uses the digitized signal to determine the temperature of the fluid 56. Utilizing the sensing apparatus 40, the microprocessor is adapted to determine the fluid temperature with significantly improved speed and accuracy as noted above.

It should be understood that although preferred embodiments of the invention have been described by way of illustrating the invention, the invention includes all modifications and equivalents thereof falling within the scope of the appended claims.

I claim:

1. In combination with temperature sensing means having a body of electrical resistance material of a resistivity which varies with change in temperature, lead means electrically connected to the body for connecting the body in an electrical circuit, means encapsulating the body and portions of the lead means for shielding the body from an environment in a zone whose temperature is to be monitored and for locating the lead means relative to the body, and means having relatively greater thermal conductivity that the encapsulating means secured in heat-transfer relation to the body of resistance material so that a portion of the thermally-conducting means extends outside the encapsulating means for receiving and conducting heat to the body from the temperature zone to be monitored, mounting means for the temperature sensing means comprising a plurality of housing sections of a material of relatively lower thermal conductivity than said thermally conducting means, said housing section being secured together to hold the temperature sensing means therebetween with said extending portion of the thermally conducting means exposed to receive and conduct heat from the temperature zone to be monitored, said housing sections having extensions thereof disposed in spaced surrounding relation to the exposed portion of the thermally conducting means to shield said exposed portion from physical blows while permitting fluid flow around said exposed portion in the zone to be monitored.

2. Temperature sensing apparatus as set forth in claim 1 wherein said housing sections are formed of organic material of relatively low thermal conductivity and have interfitting portions locating the sections relative to each other to hold the temperature sensing means therebetween, and a metal bushing having mounting means thereon is fitted over the housing sections at one end thereof to hold the sections together with said housing extensions and the extending portion of the thermally-conducting means extending from one end of from one end of the bushing.

3. Temperature sensing apparatus as set forth in claim 2 wherein said housing extensions engage the extending portion of the thermally-conducting means at the distal end thereof for limiting vibration of the thermally-conducting means during use.

4. Temperature sensing apparatus as set forth in claim 2 wherein said encapsulating means include first means encapsulating the body of resistance material and adjacent first ends of said lead means and second means spaced from the first means encapulating additional portions of the lead means intermediate said first ends and opposite ends of the lead means, said lead means having first portions of limited cross-sectional size between said first and second encapsulating means limiting heat transfer from the body of resistance material through the lead means, said lead means being of relatively greater cross-sectional size between said additional portions of the lead means and the opposite ends of the lead means for providing relatively greater strength in electrically connecting the body of resistance material in an electrical circuit.

5. Temperature sensing apparatus as set forth in claim 4 wherein said housing sections engage said second encapsulating means for holding the temperature sensing means between the sections with said lead means portions of said relatively greater cross-sectional size extending from the opposite end of the metal bushing to provide strain relief between the electrical connection of said lead means to the body of resistance material and the electrical connection of said lead means in an electrical circuit.

6. Temperature sensing means as set forth in claim 5 wherein said housing extensions engage the extending portions of the thermally-conducting means at the distal end thereof for supporting said extending portion of the thermal-conducting means, the first encapsulating means, and said first portions of the lead means to be exposed to substantially the same temperature conditions in a temperature zone to be monitored while limiting vibration thereof during use.

7. A fast response temperature sensing apparatus particularly adapted for use in a rarefied media comprising a generally planar body of crystalline semiconducting material having a pair of broad flat opposite sides and having a selected dopant concentration therein providing the material with a precisely predetermined positive temperature coefficient of resistivity in a selected temperature range, a pair of ohmic contact means secured to the respective opposite sides of the body to form a spreading resistance type of resistor element having precisely predetermined resistance properties, metal lead frame means having a pair of leads connected to the respective contact means for electrically connecting the resistor element in an electrical circuit, dielectric means encapsulating the resistor element and portions of the leads for shielding the element from an environment in a zone whose temperature is to be monitored and for locating the leads relative to the element, said lead frame means having vane means of relatively greater thermal conductivity than the encapsulating means secured in heat-transfer relation to the resistor element to extend outside the encapsulating means for receiving and rapidly conducting heat to the resistor element from the temperature zone to be monitored, said spreading resistor element having a heat capacity which is small relative to the heat capacity of the vane means so that change in temperature of the element occurs substantially simultaneously with change in temperature of the vane means, a plurality of housing sections of a material of relatively lower thermal conductivity than said vane means, said housing sections being secured together to engage and hold said encapsulating means therebetween for exposing the vane means to promptly receive and conduct heat from a rarefied or other fluid in the temperature zone to be monitored, said housing sections having extensions thereof disposed in spaced surrounding relation to the vane means for protecting the vane means from physical blows while permitting flow of said fluid around the vane means.

8. A fast response temperature sensing apparatus as set forth in claim 7 wherein said encapsulating means include first means encapsulating the resistor element and adjacent, first ends of the leads and second means spaced from the first means encapsulating additional portions of the leads intermediate said first lead ends and opposite ends of the leads, said leads having first portions of limited cross-sectional size between the first and second encapsulating means limiting heat transfer from the resistor element through the leads, said leads having a relatively greater cross-sectional size between said additional lead portions and the opposite lead ends providing relatively greater lead strength in electrically connecting the resistor element in an electrical circuit.

9. A fast response temperature sensing apparatus as set forth in claim 8 wherein said housing sections engage said second encapsulating means to provide strain relief between electrical connection of the leads to the resistor element and electrical connection of the leads in an electrical circuit.

10. A fast response temperature sensing apparatus as set forth in claim 9 having a metal bushing having mounting means thereon for use in mounting the apparatus, said bushing being fitted over the housing sections at one end thereof to hold the sections together with said housing sections and said vane means extending from one end of the bushing to be disposed in the temperature zone to be monitored, said bushing being located on said housing sections so that said opposite lead ends extend from the opposite end of the bushing to be connected in said electrical circuit.

11. A temperature sensing device comprising a body of electrical resistance material having a resistivity which varies with change in temperature, lead means electrically connected to the body for connecting the body in an electrical circuit, means encapsulating the body and portions of the lead means for shielding the body from an environment in a zone whose temperature is to be monitored and for locating the lead means relative to the body, and thermally-conducting means of relatively greater thermal conductivity than the encapsulating means secured in heat-transfer relation to the body of resistance material so that a portion of the thermally conducting means extends outside the encapsulating means for receiving and conducting heat to the body from the temperature zone to be monitored, said encapsulating means including a first portion encapsulating the body of resistance material and the first ends of the lead means adjacent to the body of resistance material, and a separate second portion spaced from the first portion encapsulating additional portions of the lead means between said first ends and the opposite ends of the lead means, said lead means having first portions of limited cross-sectional size located to extend between the first and second encapsulating portions for limiting heat-transfer from the body through the lead means while permitting the device to be mounted with said first and second encapsulating portions held separated to limit stress on said first lead portions, said lead means being of relatively greater cross-sectional size between said additional portions of the lead means and said opposite ends of the lead means providing relatively greater strength in electrically connecting the body of resistance material in an electrical circuit.

12. A method of making temperature sensing means comprising the steps of providing lead frame means having thermal-conducting vane means and having a pair of leads, said leads having a limited cross-sectional size between first end and additional portions thereof and having relatively greater cross sectional size between said additional portions and opposite ends thereof, securing a body of electrical resistance material having a resistivity which varies with change in temperature in heat-transfer relation to the vane means, electrically connecting the body to the first ends of the leads for connecting the body in an electrical circuit while restricting heat-transfer from the body through the first lead ends, encapsulating the body and first lead ends in first encapsulating means for shielding the body in an environment in a zone whose temperature is to be monitored and for locating the leads relative to the body, and encapsulating said additional lead portions in second encapsulating means spaced from the first means to provide strain relief between the first and opposite lead ends when connecting the body in an electrical circuit, said vane means having relatively greater thermal conductivity than said encapsulating means, and said body being encapsulated so that the vane means extends outside the encapsulating means for receiving and rapidly conducting heat to the body from the temperature zone to be monitored.

* * * * *